Figure 1:
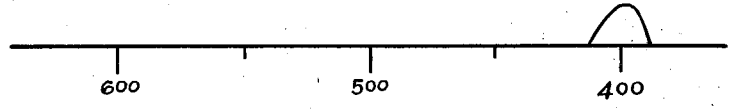

UNITED STATES PATENT OFFICE 2,251,777

SENSITIZED PHOTOGRAPHIC EMULSION

Fritz Bauer, Dessau, and Gustav Wilmanns, Wolfen, Kreis Bitterfeld, Germany, assignors, by mesne assignments, to General Aniline & Film Corporation, New York, N. Y., a corporation of Delaware Application December 8, 1939, Serial No. 308,148
In Germany December 9, 1938

2 Claims. (Cl. 95—7)

Recently there have been published carbocyanine dyestuffs and especially trimethinecyanines containing an oxdiazole-, thiodiazole- or selenodiazole ring, substituted by the methyl group. Such dyestuffs containing the methylthiodiazole ring have been described for photographic sensitizing. The methyloxdiazolecarbocyanines are supposed to also sensitize photographic emulsions, but until now no definite dyestuff with information about its sensitizing qualities has been described.

According to this invention we have found that trimethine dyestuffs containing the furyloxdiazole ring show very favourable sensitizing qualities and a by far higher sensitizing intensity than the known methyloxdiazolecarbocyanines. This furyloxdiazole ring is placed on the one side of the trimethine chain, whereas to the other side may be attached any of the heterocyclic nitrogenous rings known in cyanine dyestuff chemistry.

These dyestuffs are capable of sensitizing any silver halide emulsion, but preferably are applied for sensitizing silver chloride emulsions, their spectral sensitivity being only so much enlarged, that they can still be worked in bright yellow or green dark-room light. A special advantage of the new dyestuffs is their ability to be rapidly and thoroughly washed out from the light sensitive emulsions.

The dyestuffs are prepared according to the ω-aldehyde condensation process by condensing with the quaternary salt of the 2-methyl-5-furyl-oxdiazole in presence of pyridine- and acetic anyhdride, the ω-aldehydes of the heterocyclic nitrogenous nuclei which are commonly used in cyanine dyestuff chemistry and which are selected from the group consisting of thiazole, oxazole, selenazole, indoline, quinoline, thiazoline.

The 2-methyl-5-furyl-oxdiazole is obtained in the following way:

84 g. monacetyl pyromucic acid hydrazine (J. pr. Ch. 65, 28) are distilled in vacuo together with 40 g. $P_2O_5$. Only a colorless oil distils over, which solidifies in the receiver. The product is again distilled in vacuo and yields 24 g. B. P. $_{5,5}$: 133–134° C.

The invention is further illustrated by the accompanying self-explanatory drawing depicting sensitizing curves of the dyestuffs of the application, especially when read with the following examples describing the preparation of sensitizers according to the invention.

Example 1

A dyestuff of the following constitution has a sensitizing maximum at about 488 µµ.

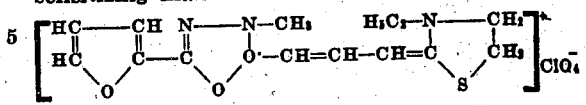

This dyestuff is prepared in the following way: 3.2 g. N-ethyl-2-methine-thiazoline-ω-aldehyde are dissolved in 10 cc. pyridine and 120 drops acetic anhydride. With stirring and cooling in a freezing mixture 5.9 g. 2-methyl-5-furyl-oxdiazole methiodide are added in portions. After stirring for about one hour in the cold, 10 cc. methanol are added and treated with 30 cc. 10% sodium perchlorate solution. After adding some pieces of ice the dyestuff crystallizes, is sucked off and recrystallized several times from methanol. Absorption maximum 460 mµ.

Figure 2:
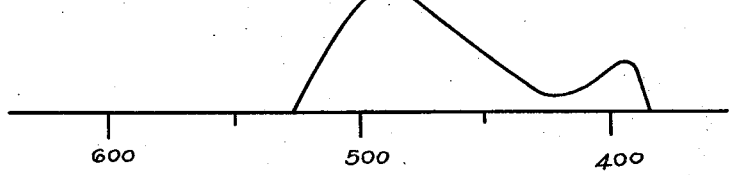

When incorporated in a silver chloride emulsion the dyestuff has a sensitivity curve corresponding to that illustrated in Figure 2 of the accompanying drawing.

Example 2

A dyestuff of the following constitution has a sensitizing maximum at about 488 µµ.

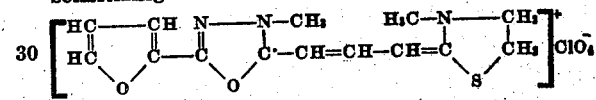

This dyestuff is prepared in the following way: 2.5 g. N-methyl-2-methine-thiazoline-ω-aldehyde are dissolved in 10 cc. pyridine and 120 drops acetic anhydride. While cooling with a freezing mixture and stirring 5 g. 2-methyl-5-furyl-oxdiazole-methiodide are added. Further treatment as in Example 1. Absorption maximum 460 mµ.

Figure 3:
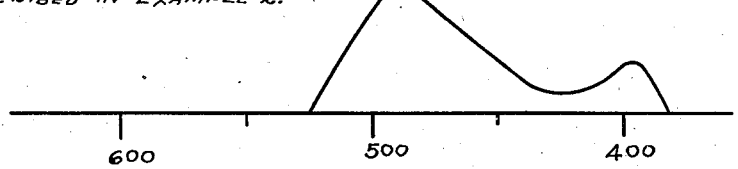

When incorporated in a silver chloride emulsion the dyestuff shows a sensitivity curve corresponding to Figure 3 of the accompanying drawing.

Example 3

A dyestuff of the following constitution has a sensitizing maximum at about 480 µµ.

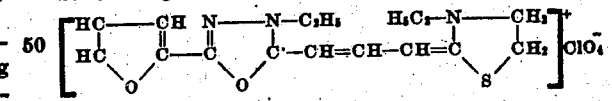

This dyestuff is prepared in the following way: 3.2 g. N-ethyl-2-methine-thiazoline-ω-aldehyde are dissolved in 10 cc. pyridine and 120 drops acetic anhydride. By cooling in a freezing mixture and stirring 6.2 g. 2-methyl-5-furyl-oxdiazole-ethiodide are added. Further treatment as in Example 1. Absorption maximum about 460 m$\mu$.

Figure 4:
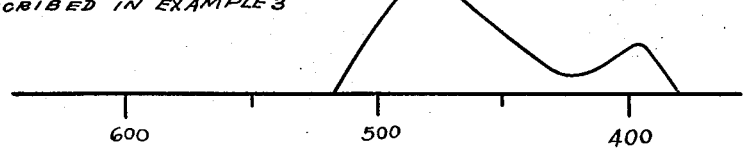

When incorporated in a silver chloride emulsion the dyestuff shows a sensitivity curve corresponding to Figure 4 of the accompanying drawing.

We claim:

1. Photographic silver halide gelatin emulsions containing a furyloxdiazole-trimethinecyanine dyestuff.

2. Photographic silver halide gelatin emulsions containing a furyloxdiazole-trimethinecyanine dyestuff selected from the group consisting of a furyloxdiazole-furyloxdiazole-trimethinecyanine dyestuff, a furyloxdiazole-thia-trimethinecyanine dyestuff, a furyloxdiazole-oxa-trimethinecyanine dyestuff, a furyloxdiazole-indo-trimethinecyanine dyestuff, a furyloxdiazole-quino-trimethinecyanine dyestuff and a furyloxdiazole-thiazoline-trimethinecyanine dyestuff.

FRITZ BAUER.
GUSTAV WILMANNS.